United States Patent
Jung et al.

(10) Patent No.: US 12,473,487 B2
(45) Date of Patent: Nov. 18, 2025

(54) METHOD OF PREPARING QUANTUM DOT, QUANTUM DOT, AND ELECTRONIC APPARATUS INCLUDING THE QUANTUM DOT

(71) Applicant: SAMSUNG DISPLAY CO., LTD., Yongin-si (KR)

(72) Inventors: Junehyuk Jung, Yongin-si (KR); Jaebok Chang, Yongin-si (KR); Sungjae Kim, Yongin-si (KR); Juo Nam, Yongin-si (KR); Donghee Lee, Yongin-si (KR); Taekjoon Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 430 days.

(21) Appl. No.: 17/960,284

(22) Filed: Oct. 5, 2022

(65) Prior Publication Data
US 2023/0193122 A1    Jun. 22, 2023

(30) Foreign Application Priority Data
Dec. 17, 2021  (KR) .......... 10-2021-0182204

(51) Int. Cl.
| | | |
|---|---|---|
| *C09K 11/02* | (2006.01) | |
| *B82Y 20/00* | (2011.01) | |
| *B82Y 40/00* | (2011.01) | |
| *C09K 11/08* | (2006.01) | |
| *C09K 11/62* | (2006.01) | |
| *C09K 11/70* | (2006.01) | |
| *C09K 11/88* | (2006.01) | |

(52) U.S. Cl.
CPC ........ *C09K 11/025* (2013.01); *C09K 11/0883* (2013.01); *C09K 11/623* (2013.01); *C09K 11/703* (2013.01); *C09K 11/883* (2013.01); *B82Y 20/00* (2013.01); *B82Y 40/00* (2013.01)

(58) Field of Classification Search
CPC ... C09K 11/883; C09K 11/0883; C09K 11/02; C09K 11/623; C09K 11/703
See application file for complete search history.

(56) References Cited

U.S. PATENT DOCUMENTS

| | | | |
|---|---|---|---|
| 9,790,425 B2 | 10/2017 | McDaniel | |
| 10,316,250 B2 | 6/2019 | Guo et al. | |
| 10,581,008 B2 | 3/2020 | Lee et al. | |
| 10,988,685 B2 | 4/2021 | Ahn et al. | |
| 2020/0079996 A1 | 3/2020 | Grumbach et al. | |
| 2020/0087572 A1* | 3/2020 | Davidi | C09K 11/025 |

FOREIGN PATENT DOCUMENTS

| | | |
|---|---|---|
| KR | 101739751 B1 | 5/2017 |
| KR | 1020170087643 A | 7/2017 |
| KR | 1020180059724 A | 6/2018 |
| KR | 1020190097103 A | 8/2019 |
| KR | 1020190135384 A | 12/2019 |
| WO | WO 2019/215060 * | 11/2019 |

* cited by examiner

*Primary Examiner* — C Melissa Koslow
(74) *Attorney, Agent, or Firm* — CANTOR COLBURN LLP

(57) ABSTRACT

Provided are a method of preparing a quantum dot, a quantum dot prepared thereby, and an electronic apparatus including the quantum dot. The method includes: preparing a core including a Group III element, a Group V element, and gallium (Ga); and preparing a shell covering the core by using a composition for forming the shell. The composition for forming the shell includes a first additive, and the first additive is a metal halide.

20 Claims, 3 Drawing Sheets

[COMPARATIVE EXAMPLE 1]     [EXAMPLE 1]

METHOD OF PREPARING QUANTUM DOT, QUANTUM DOT, AND ELECTRONIC APPARATUS INCLUDING THE QUANTUM DOT

This application claims priority to Korean Patent Application No. 10-2021-0182204, filed on Dec. 17, 2021, in the Korean Intellectual Property Office, and all the benefits accruing therefrom under 35 U.S.C. § 119, the content of which in its entirety is herein incorporated by reference.

BACKGROUND

1. Field

One or more embodiments relate to a method of preparing a quantum dot, a quantum dot, and an electronic apparatus including the quantum dot.

2. Description of the Related Art

Quantum dots are nanocrystals of semiconductor materials and exhibit a quantum confinement effect. When reaching an energy excited state by receiving light from an excitation source, the quantum dots emit energy by themselves according to a corresponding energy band gap. In this regard, even in the case of the same material, a wavelength varies depending on a particle size of each quantum dot. Thus, by adjusting the size of the quantum dots, light having a desired wavelength range may be obtained, and excellent color purity and high luminescence efficiency may be obtained. In this regard, the quantum dots may be applicable to various devices or apparatuses.

SUMMARY

One or more embodiments include a method of preparing a quantum dot having excellent characteristics in terms of chemical stability and photoluminescence.

Additional aspects will be set forth in part in the description which follows and, in part, will be apparent from the description, or may be learned by practice of the presented embodiments of the disclosure.

According to one or more embodiments, provided is a method of preparing a quantum dot, the method including preparing a core including a Group III element, a Group V element, and gallium (Ga), and preparing a shell covering the core by using a composition for forming the shell, where the composition for forming the shell includes a first additive, and the first additive is a metal halide.

According to one or more embodiments, provided is a quantum dot prepared by the method.

According to one or more embodiments, provided is an electronic apparatus including the quantum dot.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
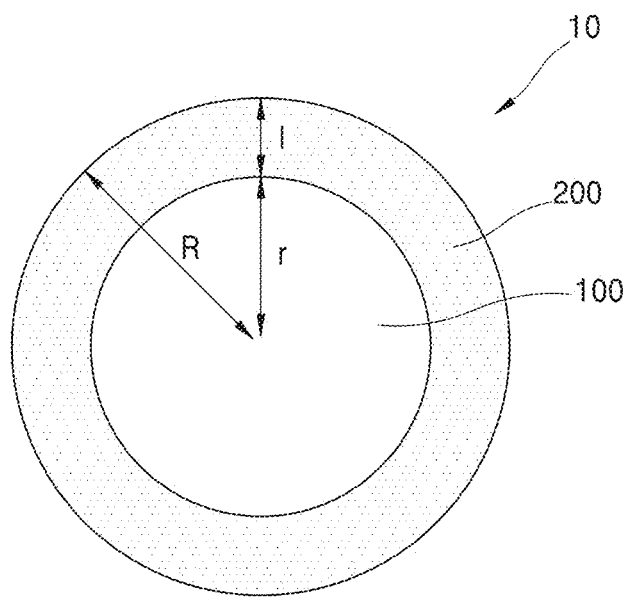
FIG. 1 is a diagram of a quantum dot according to an embodiment.

Reference will now be made in detail to embodiments, examples of which are illustrated in the accompanying drawings, where like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. The terminology used herein is for the purpose of describing particular embodiments only and is not intended to be limiting. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

Because the disclosure may have diverse modified embodiments, embodiments are illustrated in the drawings and are described in the detailed description. An effect and a characteristic of the disclosure, and a method of accomplishing these will be apparent when referring to embodiments described with reference to the drawings. The disclosure may, however, be embodied in many different forms and should not be construed as limited to the embodiments set forth herein.

It will be understood that although the terms "first," "second," etc. used herein may be used herein to describe various components, these components should not be limited by these terms. These components are only used to distinguish one component from another.

An expression used in the singular encompasses the expression of the plural, unless it has a clearly different meaning in the context. That is, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or."

It will be further understood that the terms "includes" and/or "comprises" used herein specify the presence of stated features or elements, but do not preclude the presence or addition of one or more other features or elements. Unless defined otherwise, the terms "include or have" may refer to both the case of consisting of features or components described in a specification and the case of further including other components.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

The term "Group II" as used herein may include a Group IIA element and a Group IIB element on the International Union of Pure and Applied Chemistry ("IUPAC") periodic table, and examples of the Group II element are Zn, Cd, Hg, and Cn, but are not limited thereto.

The term "Group III" as used herein may include a Group IIIA element and a Group IIIB element on the IUPAC periodic table, and examples of the Group III element are Al, In, Ga, Tl, and Nh, but are not limited thereto.

The term "Group V" as used herein may include a Group VA element and a Group VB element on the IUPAC periodic table, and examples of the Group V element are N, P, and As, but are not limited thereto.

The term "Group VI" as used herein may include a Group VIA element and a Group VIB element on the IUPAC periodic table, and examples of the Group VI element are O, S, Se, and Te, but are not limited thereto.

The terms "quantum yield" and "luminescence efficiency" may be used substantially in the same meaning.

An aspect of the present disclosure provides a method of preparing a quantum dot. The method includes: preparing a core including a Group III element, a Group V element, and gallium (Ga); preparing a shell covering the core using a composition for forming the shell.

In an embodiment, the composition for forming the shell may comprise a first additive.

In an embodiment, the first additive may include a metal halide.

In an embodiment, the first additive may include a metal halide represented by Formula 1:

$$A^{m+}(X^-)_m \quad \text{[Formula 1]}$$

in Formula 1,
$A^{m+}$ may be an m-valent cation of the metal, m may be 1, 2, 3, or 4, and
X− may be a halide ion.

In an embodiment, $X^-$ may be $F^-$, $Cl^-$, $Br^-$, or I−.

In an embodiment, the first additive may include a zinc halide, an indium halide, an aluminum halide, a gallium halide, or any combination thereof.

In an embodiment, the first additive may include $ZnCl_2$, $InCl_3$, $AlCl_3$, $GaCl_3$, NaCl, $ZnI_2$, $AlI_3$, $GaI_3$, or any combination thereof.

In the method or preparing the quantum dot according to an embodiment, by using the composition including the first additive for forming the shell to form the shell, a crystal plane of the core surface may be stabilized, and stacking faults may be reduced. Accordingly, in the quantum dot prepared by the method disclosed herein, a shell may be uniformly formed on the core, and a protective layer may be easily formed with a ligand on a surface of the shell, so that the quantum dot may have improved chemical stability and improved PL properties.

In an embodiment, the composition for forming the shell may comprise: at least one of a precursor including a Group II element, a precursor including a Group III element, a precursor including a Group V element, and a precursor including a Group VI element; and the first additive.

In an embodiment, the composition for forming the shell may further comprise a second additive.

In an embodiment, the second additive may be an aliphatic amine.

In an embodiment, the second additive may be an unsaturated aliphatic amine.

In an embodiment, the second additive may be an oleylamine.

In the method of preparing the quantum dot according to an embodiment, by using the composition including the first additive and the second additive for forming the shell to form the shell, a crystal plane of the core surface may be effectively stabilized and stacking faults may be effectively reduced. Accordingly, in the quantum dot prepared by the method disclosed herein, a shell may be uniformly formed on the core, and a protective layer may be easily formed with a ligand on a surface of the shell, so that the quantum dot may have improved chemical stability and improved PL properties at a low temperature.

In an embodiment, in the preparing of the core, a composition for forming the core, the composition comprising a precursor including a Group III element, a precursor including a Group V element, and a Ga precursor, may be used.

In an embodiment, the composition for forming the core may further comprise a third additive.

In an embodiment, the third additive may be an aliphatic amine.

In an embodiment, the third additive may be an unsaturated aliphatic amine.

In an embodiment, the third additive may be an oleylamine.

In an embodiment, the composition for forming the core may further comprise a fourth additive.

In an embodiment, the fourth additive may be a fatty acid or a salt thereof.

In an embodiment, the fourth additive may be an unsaturated fatty acid or a salt thereof.

In an embodiment, the fourth additive may be sodium oleate.

In the method or preparing the quantum dot according to an embodiment, by using the composition comprising the third additive and/or the fourth additive for forming the core to form the core, a crystal plane of the core surface may be stabilized, and stacking faults may be effectively reduced. Accordingly, the quantum dot prepared by the method may have the shell uniformly formed on the core, and trap emission may be reduced in the PL spectrum, thereby effectively improving the PL characteristics.

In an embodiment, the core may comprise a Group III element, a Group V element, and Ga. In an embodiment, the core comprises InGaP.

In an embodiment, an amount of Ga in the core may be in a range of about 1 part by weight to about 200 parts by weight with respect to 100 parts by weight of the Group III element included in the core.

In an embodiment, the core may comprise three or more elements, which are different from each other. For example, the core may comprise two or more kinds of cation elements and one or more kinds of anion elements.

In an embodiment, the Group III element included in the core may be Al, In, or Tl.

In an embodiment, a radius of the core may be in a range of about 0.1 nanometers (nm) to about 5 nm or about 0.5 nm to about 2.5 nm. For example, the radius may be in a range of about 0.6 nm to about 2.4 nm, or about 0.75 nm to about 2.25 nm, or about 1 nm to about 2 nm.

In an embodiment, the shell may comprise a Group II-VI compound, a Group III-V compound, or a combination thereof.

Examples of the Group II-VI compound are: a binary compound, such as CdSe, CdTe, ZnS, ZnSe, ZnTe, ZnO, HgS, HgSe, HgTe, MgSe, MgS, etc.; a ternary compound, such as CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, etc.; a quaternary compound, such as CdZnSeS, CdZnSeTe, CdZnSTe, CdHgSeS, CdHgSeTe, CdHgSTe, HgZnSeS, HgZnSeTe, HgZnSTe, etc.; or any combination thereof.

Examples of the Group III-V compound are: a binary compound, such as GaN, GaP, GaAs, GaSb, AlN, AlP, AlAs, AlSb, InN, InP, InAs, InSb, etc.; a ternary compound, such as GaNP, GaNAs, GaNSb, GaPAs, GaPSb, AlNP, AlNAs, AlNSb, AlPAs, AlPSb, InGaP, InNP, InAlP, InNAs, InNSb, InPAs, InPSb, etc.; a quaternary compound, such as GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, etc.; or any combination thereof. The Group III-V compound may further comprise a Group II element. Examples of the Group III-V compound further including a Group II element are InZnP, InGaZnP, InAlZnP, etc.

In an embodiment, the shell may comprise ZnSe, ZnS, ZnTe, ZnO, ZnMg, ZnMgSe, ZnMgS, ZnMgAl, GaSe, GaTe, GaP, GaAs, GaSb, InAs, InSb, AlP, AlAs, AlSb, or any combination thereof.

In an embodiment, the shell may comprise a metal or non-metal oxide, a semiconductor compound, or a combination thereof.

In an embodiment, for example, the metal or non-metal oxide may be: a binary compound, such as $SiO_2$, $Al_2O_3$, $TiO_2$, ZnO, MnO, $Mn_2O_3$, $Mn_3O_4$, CuO, FeO, $Fe_2O_3$, $Fe_3O_4$, CoO, $Co_3O_4$, NiO, etc.; or a ternary compound, such as $MgAl_2O_4$, $CoFe_2O_4$, $NiFe_2O_4$, $CoMn_2O_4$, etc.

In addition, for example, the semiconductor compound may be CdS, CdSe, CdTe, ZnS, ZnSe, ZnTe, ZnSeS, ZnTeS, GaAs, GaP, GaSb, HgS, HgSe, HgTe, InAs, InP, InGaP, InSb, AlAs, AlP, AlSb, etc.

In an embodiment, the shell may have a greater band gap energy than a band gap energy of the core.

In an embodiment, the quantum dot may further comprise a compound other than the above-described composition.

In an embodiment, for example, the quantum dot may further comprise, in the core and/or the shell, the Group II-VI compound, a Group III-VI compound, a Group III-V compound, a Group IV-VI compound, a Group IV element or compound, a Group compound, or a combination thereof.

In an embodiment, the shell may include one or more layers. For example, the quantum dot may include: the core and a first shell layer arranged outside the core; the core, the first shell layer, and a second shell layer arranged outside the first shell layer; or the core, the first shell layer, the second shell layer, and a third shell layer arranged outside the second shell layer. In one or more embodiments, the quantum dot may include the shell consisting of four or more layers.

In an embodiment, the shell may include the first shell layer and the second shell layer, where a material included in the first shell layer and a material included in the second shell layer may be identical to or different from each other.

In one or more embodiments, the shell may further include an intermediate shell layer arranged between the first shell layer and the second shell layer, where the intermediate shell layer may include a material identical to a material included in the first shell layer and a material included in the second shell layer.

In an embodiment, the concentration of the elements included in the shell may form a concentration gradient according to the distance from the core.

In an embodiment, a thickness of the shell may be in a range of about 0.1 nm to about 10 nm, for example, about 0.5 nm to about 5 nm, about 0.7 nm to about 3 nm, about 1 nm to about 2 nm, or about 1.2 nm to about 1.5 nm.

In an embodiment, the shell may include the first shell layer and the second shell layer, where a thickness of the first shell layer may be in a range of about 0.1 nm to about 10 nm, for example, about 0.5 nm to about 3 nm.

In an embodiment, the shell may include the first shell layer and the second shell layer, where a thickness of the second shell layer may be in a range of about 0.1 nm to about 10 nm, for example, about 0.5 nm to about 4 nm.

The shell of the quantum dot may act as a protective layer to prevent chemical denaturation of the core and maintain semiconductor characteristics, and/or may act as a charging layer to impart electrophoretic characteristics to the quantum dot.

In an embodiment, the Group II element may be Zn, Cd, or Hg.

In an embodiment, the Group III element may be Al, Ga, In, or Tl.

In an embodiment, the Group V element may be N, P, or As.

In an embodiment, the Group VI element may be S, Se, or Te.

In an embodiment, the precursor including the Group II element may be: zinc or a zinc-containing compound; cadmium or a cadmium-containing compound; or mercury or a mercury-containing compound.

In an embodiment, for example, the precursor including the Group II element may be zinc acetate, dimethyl zinc, diethyl zinc, zinc carboxylate, zinc acetylacetonate, zinc iodide, zinc bromide, zinc chloride, zinc fluoride, zinc carbonate, zinc cyanide, zinc nitrate, zinc oxide, zinc peroxide, zinc perchlorate, zinc sulfate, cadmium oxide, dimethyl cadmium, diethyl cadmium, cadmium carbonate, cadmium acetate dihydrate, cadmium acetylacetonate, cadmium fluoride, cadmium chloride, cadmium iodide, cadmium bromide, cadmium perchlorate, cadmium phosphide, cadmium nitrate, cadmium sulfate, cadmium carboxylate, mercury iodide, mercury bromide, mercury fluoride, mercury cyanide, mercury nitrate, mercury perchlorate, mercury sulfate, mercury oxide, mercury carbonate, mercury carboxylate, and the like.

In an embodiment, the precursor including the Group III element may be: aluminum or an aluminum-containing compound; gallium or a gallium-containing compound; indium or an indium-containing compound; or thallium a thallium-containing compound.

In an embodiment, for example, the precursor including the Group III element may be aluminum phosphate, aluminum acetylacetonate, aluminum chloride, aluminum fluoride, aluminum oxide, aluminum nitrate, aluminum sulfate, gallium acetylacetonate, gallium chloride, gallium fluoride, gallium oxide, gallium nitrate, gallium sulfate, indium acetate, indium chloride, indium oxide, indium nitrate, indium sulfate, indium carboxylate, and the like.

In an embodiment, the precursor including the Group V element may be: nitrogen or a nitrogen-containing compound; phosphorus or a phosphorus-containing compound; or arsenic or an arsenic-containing compound.

In an embodiment, for example, the precursor including the Group V element may be alkyl phosphine, tristrialkylsilyl phosphine, trisdialkylsilyl phosphine, trisdialkylamino phosphine, arsenic oxide, arsenic chloride, arsenic sulfate, arsenic bromide, arsenic iodide, nitric oxide, nitric acid, ammonium nitrate, and the like.

In an embodiment, the precursor including the Group VI element may be: sulfur or a sulfur-containing compound; selenium or a selenium-containing compound; or tellurium or a tellurium-containing compound.

In an embodiment, for example, the precursor including the Group VI element may be sulfur, trialkylphosphine sulfide, trialkenylphosphine sulfide, alkylamino sulfide, alkenylamino sulfide, alkylthiol, selenium, trialkylphosphine selenide, trialkenylphosphine selenide, alkylamino selenide, alkenylamino selenide, trialkylphosphine telluride, trialkenylphosphine telluride, alkylamino telluride, alkenylamino telluride, and the like.

In an embodiment, the composition for forming the core and/or the composition for forming the shell may further comprise a ligand and a solvent.

In an embodiment, the method of preparing the quantum dot may further include surface-treating the surface of the shell with an organic ligand or a metal halide.

In an embodiment, the organic ligand may include a $C_4$-$C_{30}$ fatty acid.

In an embodiment, for example, the organic ligand may include palmitic acid, palmitoleic acid, stearic acid, oleic acid, trioctylphosphine, trioctylphosphine oxide, oleylamine, octylamine, trioctyl amine, hexadecylamine, octanethiol, dodecanethiol, hexylphosphonic acid, tetradecylphosphonic acid, octylphosphonic acid, and the like.

In an embodiment, the solvent included in the composition for forming the core and/or the composition for forming the shell may be an organic solvent. For example, the solvent may include 1-octadecene ("ODE"), trioctylamine ("TOA"), trioctylphosphine ("TOP"), or any combination thereof.

In an embodiment, the composition for forming the core and/or the composition for forming the shell may further include an ionic liquid.

The ionic liquid may include a compound including an organic cation and an organic anion or a compound including an organic cation and an inorganic anion. Unlike a solid salt, the size of the cation and anion is relatively large, and thus the lattice energy is low so that the ionic liquid may accordingly have a low melting point.

In an embodiment, for example, the ionic liquid may include, as the cation, 1,3-dialkylimidazolium, N-alkylpyridium, tetraalkylammonium, tetraalkylphosphonium, or N-alkylpyrrolidinium, and as the anion, bis(trifluoromethylsulfonyl)imide, tetrafluoroborate, hexafluorophosphate, trifluoromethane sulfonate, chloride, bromide, iodide, nitrate, or acetate.

In an embodiment, the ionic liquid may have a loss tangent in a range about 0.2 to about 2.

When including the ionic liquid, the temperature or pressure of the composition for forming the core and/or the composition for forming the shell may be increased. Thus, under the high-temperature or high-pressure conditions, the productivity of the preparation of the quantum dot may be further improved.

The method of preparing the quantum dot according to an embodiment may further include irradiating the composition for forming the core with microwaves.

In an embodiment, the composition for forming the core may be heated or pressurized by the irradiated microwaves.

In an embodiment, for example, the output of the microwaves may be in a range of about 100 watts (W) to about 600 W, for example, about 100 W to about 500 W or about 100 W to about 400 W.

In an embodiment, the maximum temperature of the composition for forming the core heated by the irradiated microwaves may be in a range of about 100 degrees in Celsius (° C.) to about 350° C., for example, about 100° C. to about 320° C.

In an embodiment, the maximum pressure of the composition for forming the core pressurized by the irradiated microwaves may be in a range of about 1 atm to about 100 atm, for example, about 1 atm to about 50 atm or about 1 atm to about 25 atm.

In an embodiment, the irradiating of the composition for forming the core with the microwaves may be performed in a magnetic synthesizer.

In an embodiment, the composition for forming the quantum dot may include a microwave absorption material.

In an embodiment, a diameter of the microwave absorption material may be in a range of about 10 micrometers (μm) to about 10 millimeters (mm).

In an embodiment, the microwave absorption material may be a high dielectric material, such as perovskite, ferrite (for example, $NiFe_2O_4$), hexagonal ferrite (for example, $BaFe_6O_{19}$), iron oxide, or silicon carbide (SiC).

By including the microwave absorption material, the energy of the microwaves irradiated to the composition for forming the quantum dot may be more efficiently transferred, resulting in mass synthesis and increased productivity of the quantum dot. In addition, by controlling the type and size of the microwave absorption material, the heating rate of the composition for forming quantum dot may be increased more than tens of times, and by controlling the heating rate, the characteristics of the quantum dot may be improved.

Here, the binary compound, the ternary compound, or the quaternary compound may be present in particles at a uniform concentration, or may be present in particles with partially different concentration distributions.

Another aspect of the present disclosure provides a quantum dot prepared by the method of preparing the quantum dot.

Referring to FIG. 1, a quantum dot 10 according to an embodiment may include: a core 100 including a Group III element, a Group V element, and gallium (Ga); and a shell 200 covering the core 100.

In an embodiment, when a radius of the quantum dot 10 is R, a diameter 2R of the quantum dot 10 may be in a range of about 1 nm to about 20 nm. For example, the diameter 2R of the quantum dot 10 may be in a range of about 3 nm to about 15 nm, for example, about 4 nm to about 12 nm, about 5 nm to about 10 nm, or about 6 nm to about 9 nm.

In an embodiment, when the diameter 2R of the quantum dot 10 may be in a range of about 4 nm to about 6 nm, the quantum dot 10 may emit green light.

In an embodiment, a radius (r) of the core 100 may be in a range of about 0.1 nm to about 5 nm or about 0.5 nm to about 2.5 nm. For example, the radius r may be in a range of about 0.6 nm to about 2.4 nm, or about 0.75 nm to about 2.25 nm, or about 1 nm to about 2 nm.

In an embodiment, a thickness (I) of the shell 200 may be in a range of about 0.1 nm to about 10 nm, for example, about 0.5 nm to about 5 nm, about 0.7 nm to about 3 nm, about 1 nm to about 2 nm, or about 1.2 nm to about 1.5 nm. Here, the thickness (I) of the shell 200 corresponds to a difference between the radius (R) of the quantum dot 10 and the radius (r) of the core 100.

In an embodiment, the shell 200 may include a first shell layer and a second shell layer, where a thickness of the first shell layer may be in a range of about 0.1 nm to about 10 nm, for example, about 0.5 nm to about 3 nm.

In one or more embodiments, the shell 200 may include a first shell layer and a second shell layer, where a thickness of the second shell layer may be in a range of about 0.1 nm to about 10 nm, for example, about 0.5 nm to about 4 nm.

In an embodiment, a roundness of the quantum dot 10 may be in a range of about 0.7 to about 0.9.

In an embodiment, a shape of the quantum dot 10 is not specifically limited, and may be any one commonly used in the art. For example, the quantum dot 10 may be a spherical, pyramidal, multi-arm, or cubic nanoparticle, nanotube, nanowire, nanofiber, or nanoplate particle.

The quantum dot 10 may emit visible light other than blue light. For example, the quantum dot 10 may emit light having a maximum emission wavelength in a range of about 500 nm to about 750 nm. Accordingly, the quantum dot 10 may be designed to emit a wide color range of wavelengths.

The quantum dot 10 may have an emission wavelength in a range of about 1 nm to about 10 mm. That is, the quantum dot 10 may emit ultraviolet (UV) light, visible light, or IR light.

In an embodiment, the quantum dot 10 may emit green light having a maximum emission wavelength in a range of about 500 nm to about 590 nm. In an embodiment, the quantum dot 10 may emit green light having a maximum emission wavelength in a range of about 500 nm to about 530 nm.

In an embodiment, a full width at half maximum ("FWHM") of a PL spectrum of the quantum dot 10 may be about 60 nm or less, for example, about 55 nm or less, about 50 nm or less, or about 40 nm or less. When the FWHM of the quantum dot 10 is satisfied within the ranges above, the quantum dot 10 may provide excellent color purity and color reproducibility and improved viewing angle of light.

In an embodiment, in the PL spectrum of the quantum dot 10, the $1^{st}$ exciton peak may be within a range between about 400 nm and about 440 nm. In an embodiment, the quantum dot 10 may have a peak-to-valley ratio of the PL spectrum in a range of about 0.5 to about 0.8.

In an embodiment, the quantum dot 10 may have a quantum yield of about 80 percentages (%) or more, for example, about 90% or more.

In an embodiment, the quantum yield of the quantum dot 10 after purification with ethanol may be about 80% or more, for example, about 90% or more.

[Electronic Apparatus]

Quantum dots may be included in various electronic apparatuses. For example, an electronic apparatus including the quantum dots may be a light-emitting apparatus, an authentication apparatus, or the like.

The electronic apparatus (for example, a light-emitting apparatus or a display apparatus) may further include, i) a light-emitting device and a color filter, ii) a color conversion layer, or iii) a color filter and a color conversion layer. The color filter and/or the color conversion layer may be located in at least one traveling direction of light emitted from the light-emitting device. For example, the light emitted from the light-emitting device may be blue light or white light. In an embodiment, the light-emitting device may include the quantum dots. In an embodiment, the color conversion layer may include the quantum dot. The quantum dots may be, for example, the quantum dot as described herein.

The electronic apparatus may be applied to various displays, light sources, lighting, personal computers (for example, a mobile personal computer), mobile phones, digital cameras, electronic organizers, electronic dictionaries, electronic game machines, medical instruments (for example, electronic thermometers, sphygmomanometers, blood glucose meters, pulse measurement devices, pulse wave measurement devices, electrocardiogram displays, ultrasonic diagnostic devices, or endoscope displays), fish finders, various measuring instruments, meters (for example, meters for a vehicle, an aircraft, and a vessel), projectors, and the like.

Hereinafter, methods of preparing quantum dots according to examples will be described in more detail.

EXAMPLES

Example 1: Preparation of InGaP/ZnSe/ZnS Quantum Dot 10 millimoles (mmol) of indium acetate, 10 mmol of zinc acetate, 8 mmol of gallium acetylacetonate, and 70 mmol of palmitic acid were mixed with a solvent, i.e., 50 milliliters (mL) of 1-octadecene, and additives, i.e., 4.5 mmol of oleylamine and 0.5 mmol of sodium oleate, so as to prepare a cation precursor.

Tris(trimethylsilyl)phosphine and trioctylphosphine were mixed, so as to prepare an anion precursor.

The two types of precursors thus prepared were mixed together. The mixture was irradiated with microwaves at an intensity of 400 W, and maintained at 300° C. to form an InGaP core.

The InGaP core thus prepared was purified with a mixed solution of toluene and acetone. Then, to the InGaP core dispersed in toluene, 30 mmol of zinc oleate, 20 mmol of trioctylphosphine selenide, trioctylamine as a solvent, and 10 mmol of oleylamine and about 1.0 mmol to about 10 mmol of $ZnCl_2$ as additives were added. The resulting mixture was allowed for a reaction at a temperature of 320° C. or higher for 1 hour to form a zinc selenide shell.

Afterwards, 30 mmol of zinc oleate, 30 mmol of trioctylphosphine sulfide, and 5 mmol of oleylamine and about 1.0 mmol to about 10 mmol of $ZnCl_2$ as additives were added thereto. The resulting mixture was allowed for a reaction at a temperature of 320° C. or higher for 1 hour to form a zinc sulfide shell, thereby synthesizing a quantum dot having an InGaP/ZnSe/ZnS structure.

Comparative Example 1

A quantum dot of Comparative Example 1 was synthesized according to the same synthesis method of the quantum dot of Example 1, except that in forming a core and a shell, oleylamine, sodium oleate, and $ZnCl_2$ that were used as additives in Example 1 were not used.

Evaluation Example: Evaluation of Quantum Dot Characteristics

Figure 2:
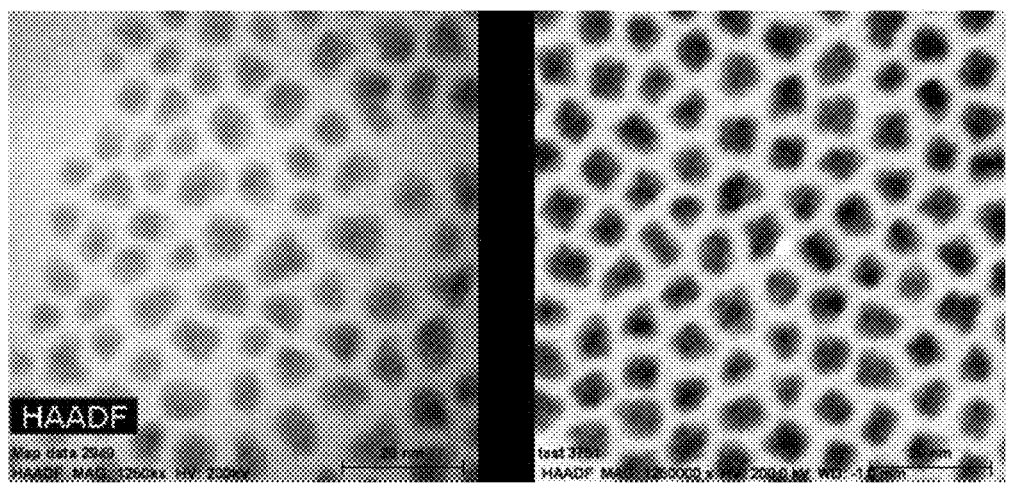
FIG. 2 shows results of observing quantum dots according to an embodiment by using a transmission electron microscope ("TEM")

Each of the quantum dots of Example 1 and Comparative Example 1 was observed with a transmission electron microscope ("TEM"), and the results are shown in FIG. 2.

Figure 3:
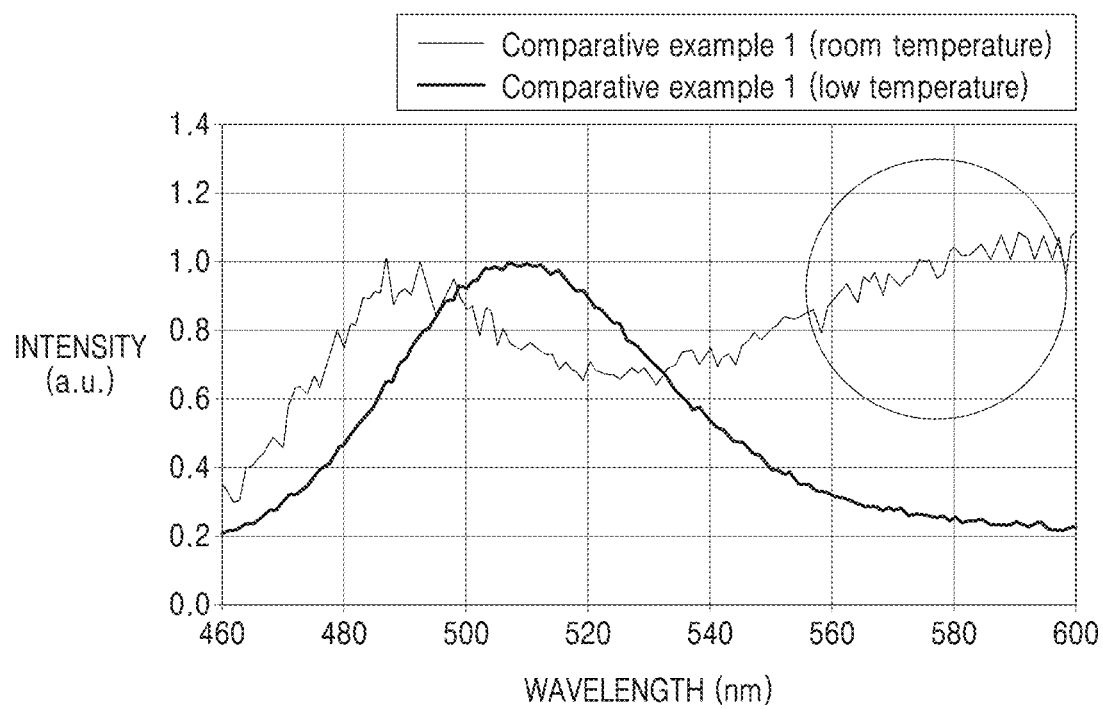
FIG. 3 shows photoluminescence ("PL") spectra of quantum dots according to an embodiment at room temperature and at a low temperature.
Figure 3:
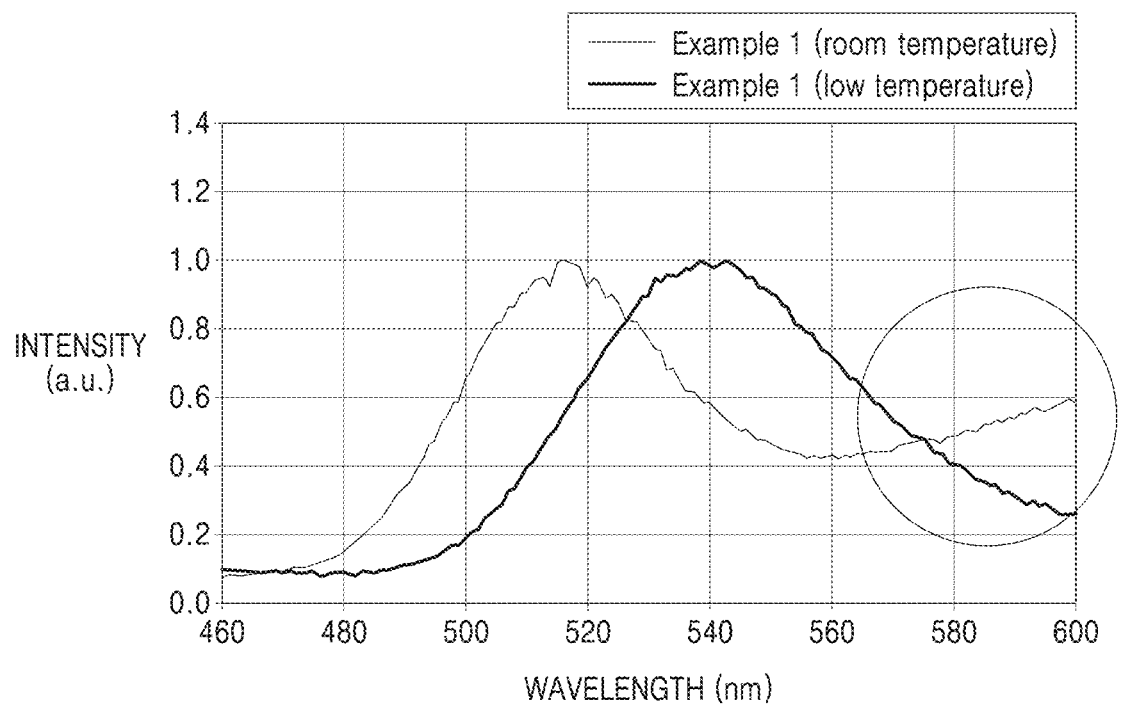
Figure 4:
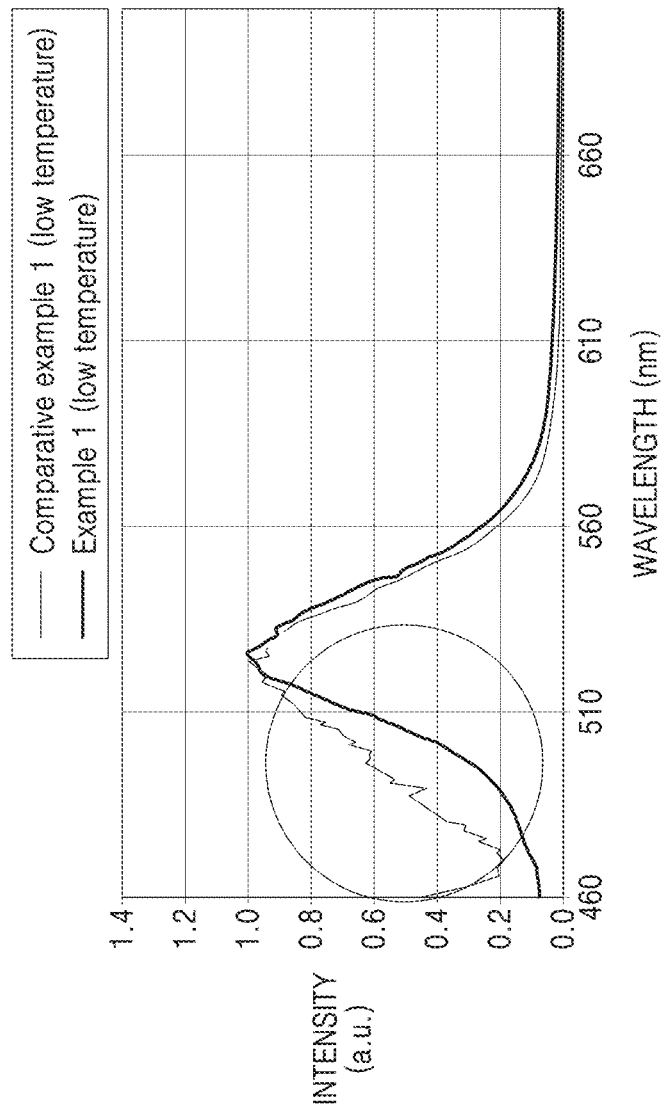
FIG. 4 shows PL spectra of quantum dots according to an embodiment at a low temperature.

In addition, for each of the quantum dots of Example 1 and Comparative Example 1, a maximum emission wavelength, FWHM, quantum yield ("QY"), and QY retention rate were evaluated, and the results are shown in Table 1. PL spectra for the quantum dots at a low temperature (−196° C.) and at room temperature (25° C.) are shown in FIGS. 3 and 4.

A measurement method was as follows: for 1 milligram per liter (mg/L) of a quantum dot-containing solution, the maximum emission wavelength and the FWHM were evaluated by analyzing the PL spectra measured using a PL spectrometer and an Ultraviolet-visible (UV-Vis) spectrometer. The QY was evaluated using an absolute quantum efficiency measuring equipment, and the QY retention rate was calculated as follows: QY after purifying quantum dots with ethanol three times/QY of unpurified quantum dots.

TABLE 1

|  | Maximum emission wavelength (nm) | FWHM (nm) | QY (%) | QY retention rate (%) |
| --- | --- | --- | --- | --- |
| Comparative Example 1 | 532 nm | 40 nm | 93% | 84% |
| Example 1 | 529 nm | 40 nm | 92% | 95% |

Referring to FIG. 2, it was confirmed that the stability of the crystal plane of the quantum dots according to an embodiment was improved. Also, referring to FIGS. 3 and 4, it was confirmed that the quantum dots according to an embodiment exhibited excellent PL characteristics due to reduced trap emission.

Referring to Table 1, it was confirmed that the quantum dots prepared according to the method of preparing the quantum dot according to an embodiment also had a narrow FWHM, a high quantum yield (QY), and a high QY retention rate. In addition, it was confirmed that the quantum dots of Example 1 had significantly excellent QY retention rate compared to the quantum dots of Comparative Example 1.

According to the one or more embodiments, a quantum dot prepared according to a method of preparing a quantum dot may have a core crystal plane with improved stability and reduced stacking fault. Accordingly, in the quantum dot prepared by the method disclosed herein, a shell may be uniformly formed on the core, and a protective layer may be easily formed with a ligand on a surface of the shell, so that the quantum dot may have improved chemical stability and improved PL properties.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of preparing a quantum dot, the method comprising:
    preparing a core comprising a Group III element, a Group V element, and gallium (Ga); and
    preparing a shell covering the core by using a composition for forming the shell,
    wherein the composition for forming the shell comprises a first additive, and
    the first additive is a metal halide; wherein the quantum dot is configured to emit green light having a maximum emission wavelength in a range of about 500 nanometers (nm) to about 590 nm.

2. The method of claim 1, wherein the composition for forming the shell further comprises: at least one of a precursor comprising a Group II element, a precursor comprising a Group III element, a precursor comprising a Group V element, and a precursor comprising a Group VI element.

3. The method of claim 1, wherein the composition for forming the shell further comprises a second additive, and the second additive is an aliphatic amine.

4. The method of claim 1, wherein the preparing of the core comprises
    preparing the core by using a composition for forming the core,
    wherein the composition for forming the core comprises a precursor comprising a Group III element, a precursor comprising a Group V element, and a Ga precursor.

5. The method of claim 4, wherein the composition for forming the core further comprises a third additive, and the third additive is an aliphatic amine.

6. The method of claim 4, wherein the composition for forming the core further comprises a fourth additive, and the fourth additive is a fatty acid or a salt thereof.

7. The method of claim 1, wherein an amount of Ga in the core is in a range of about 1 part by weight to about 200 parts by weight with respect to 100 parts by weight of the Group III element in the core.

8. The method of claim 1, wherein the core comprises three or more elements which are different from each other.

9. The method of claim 1, wherein the Group III element in the core comprises Al, In, or Tl.

10. The method of claim 1, wherein the shell comprises a Group II-VI compound, a Group III-V compound, or any combination thereof.

11. The method of claim 1, wherein the core comprises InGaP, and
    the shell comprises ZnSe, ZnS, ZnTe, ZnO, ZnMg, ZnMgSe, ZnMgS, ZnMgAl, GaSe, GaTe, GaP, GaAs, GaSb, InAs, InSb, AlP, AlAs, AlSb, or any combination thereof.

12. The method of claim 1, wherein the shell comprises a first shell layer and a second shell layer, and
    where the first shell layer and the second shell layer are different from each other.

13. The method of claim 12, wherein
    the shell further comprises an intermediate shell layer arranged between the first shell layer and the second shell layer, and
    the intermediate shell layer comprises a material that is identical to a material included in the first shell layer and a material included in the second shell layer.

14. The method of claim 1, wherein the shell comprises a first shell layer and a second shell layer, and where a material included the first shell layer and a material included the second shell layer are identical to each other.

15. The method of claim 1, wherein a concentration of an element comprised in the shell forms a concentration gradient according to a distance from the core.

16. The method of claim 1, further comprising:
    surface-treating a surface of the shell with an organic ligand or a metal halide.

17. The method of claim 1, wherein
    a thickness of the shell is in a range of about 0.5 nm to about 5 nm.

18. The method of claim 1, wherein a full width of half maximum (FWHM) of an emission wavelength spectrum of the quantum dot is 50 nm or less.

19. A quantum dot prepared by the method of claim 1.

20. An electronic apparatus comprising the quantum dot of claim 19.

* * * * *